US012590041B2

(12) United States Patent
Kajino et al.

(10) Patent No.: US 12,590,041 B2
(45) Date of Patent: Mar. 31, 2026

(54) REFRACTORY MEMBER AND METHOD OF PRODUCING THE SAME

(71) Applicant: MITSUI KINZOKU COMPANY, LIMITED, Tokyo (JP)

(72) Inventors: Hitoshi Kajino, Omuta (JP); Shoji Imaura, Omuta (JP)

(73) Assignee: MITSUI KINZOKU COMPANY, LIMITED (JP)

( * ) Notice: Subject to any disclaimer, the term of this patent is extended or adjusted under 35 U.S.C. 154(b) by 0 days.

(21) Appl. No.: 18/570,254

(22) PCT Filed: Jun. 7, 2022

(86) PCT No.: PCT/JP2022/022966
§ 371 (c)(1),
(2) Date: Dec. 14, 2023

(87) PCT Pub. No.: WO2022/264884
PCT Pub. Date: Dec. 22, 2022

(65) Prior Publication Data
US 2024/0262758 A1      Aug. 8, 2024

(30) Foreign Application Priority Data

Jun. 15, 2021     (JP) ................................. 2021-099474

(51) Int. Cl.
C04B 41/87          (2006.01)
C04B 38/00          (2006.01)
(Continued)

(52) U.S. Cl.
CPC .......... C04B 41/87 (2013.01); C04B 38/0054 (2013.01); C04B 41/4523 (2013.01);
(Continued)

(58) Field of Classification Search
None
See application file for complete search history.

(56) References Cited

U.S. PATENT DOCUMENTS

2010/0239885 A1      9/2010   Nakamura
2010/0310860 A1*    12/2010   Jung ..................... C04B 41/009
                                                             427/255.394
(Continued)

FOREIGN PATENT DOCUMENTS

CN          108028267 A        5/2018
CN          112830815 A        5/2021
(Continued)

OTHER PUBLICATIONS

International Search Report of the International Searching Authority, issued in PCT/JP2022/022966, mailed Jul. 26, 2022; ISA/JP (5 pages).
(Continued)

*Primary Examiner* — Seth Dumbris
(74) *Attorney, Agent, or Firm* — Harness, Dickey & Pierce, P.L.C.

(57)          ABSTRACT

Provided is a refractory member that is excellent in corrosion resistance and excellent in the adhesiveness of a carbide coating disposed on a surface of a graphite material base. The refractory member includes: a graphite material base; and a carbide layer disposed to coat at least a part of a surface of the graphite material base. In the refractory member, the graphite material base includes a graphite material phase and a pore, the carbide layer includes a composite region, and the composite region includes an alternating region in which a continuous graphite material phase of at least 50 μm or more and a continuous carbide phase of at least 50 μm or more alternately exist in a horizontal direction along an interface between the graphite
(Continued)

material base and the carbide layer, as viewed in a cross section along the thickness direction of the carbide layer.

12 Claims, 2 Drawing Sheets

(51) Int. Cl.
    *C04B 41/45*       (2006.01)
    *C04B 41/50*       (2006.01)

(52) U.S. Cl.
    CPC ........ *C04B 41/4558* (2013.01); *C04B 41/457*
        (2013.01); *C04B 41/5057* (2013.01); *C04B*
        *2235/3817* (2013.01); *C04B 2235/425*
        (2013.01); *C04B 2235/95* (2013.01)

(56)              References Cited

U.S. PATENT DOCUMENTS

| | | | | |
|---|---|---|---|---|
| 2012/0040172 | A1* | 2/2012 | Fujiwara | C04B 41/52 |
| | | | | 427/372.2 |
| 2018/0002236 | A1* | 1/2018 | Koga | C04B 35/52 |

| | | | | |
|---|---|---|---|---|
| 2018/0240878 | A1 | 8/2018 | Scoggins et al. | |
| 2018/0334410 | A1* | 11/2018 | Zeng | C04B 41/4529 |
| 2020/0149157 | A1* | 5/2020 | Jo | C04B 41/009 |
| 2021/0017092 | A1* | 1/2021 | Guercio | C23C 16/045 |

FOREIGN PATENT DOCUMENTS

| | | |
|---|---|---|
| JP | H8-48509 A | 2/1996 |
| JP | H8-143384 A | 6/1996 |
| JP | H9-175876 A | 7/1997 |
| JP | 2010-248060 A | 11/2010 |
| JP | 2018-145022 A | 9/2018 |
| JP | 2018-530504 A | 10/2018 |
| TW | I706929 B | 10/2020 |
| WO | 2006-085635 A1 | 8/2006 |
| WO | 2018-164118 A1 | 9/2018 |

OTHER PUBLICATIONS

Office Action issued in the corresponding Chinese Patent Application No. 202282242472.6; issed on Jun. 12, 2025 (total 13 pages).
Office Action issued in the corresponding Chinese Patent Application No. 202280042472.6; dated Feb. 14, 2026 (total 15 pages).

* cited by examiner

REFRACTORY MEMBER AND METHOD OF PRODUCING THE SAME

CROSS REFERENCE TO RELATED APPLICATIONS

This application is a 371 U.S. National Phase of International Application No. PCT/JP2022/022966, filed on Jun. 7, 2022, which claims priority to Japanese Patent Application No. 2021-099474, filed Jun. 15, 2021. The entire disclosures of the above applications are incorporated herein by reference.

BACKGROUND

Technical Field

The present invention relates to a refractory member, and more specifically relates to a refractory member in which a surface of a graphite material base is coated with a carbide layer, and a method of producing the refractory member.

Related Art

Silicon carbide (SiC) semiconductors have features in that the silicon carbide (SiC) semiconductors have not only higher heat resistance but also wider band gaps and higher dielectric breakdown electric field intensities than silicon (Si) semiconductors. Therefore, the silicon carbide (SiC) semiconductors have received attention as semiconductor materials for low-power-loss power devices. SiC is not melted under ordinary pressure but is sublimated at a temperature of around 2000° C., therefore, it is impossible to adopt a CZ method and a FZ method used in the production of Si monocrystal substances. Therefore, sublimation methods such as the modified Lely method have been primarily adopted in the mass production of SiC monocrystal substances. In recent years, the larger diameters of SiC monocrystal wafers have been demanded, methods for efficiently obtaining SiC monocrystal substances having low defects and high quality have been explored, and production methods (solution methods, gas growth methods, and the like) other than sublimation methods have received attention.

In each of the methods described above, a raw material (powder, gas, or the like) is supplied to a heat-resistant container with graphite or the like (crucible, work tube, or the like), the raw material is heated from the outside of the container by means such as high-frequency heating, and SiC monocrystal growth is performed in an ultrahigh temperature range of 2000° C. or more. Although graphite is known to be a material having heat resistance against 2500° C. or more, a surface of a graphite container is exposed to a reactive gas derived from a sublimated gas such as $Si_2C$ or $SiC_2$ sublimated by high-temperature heating, or a source gas such as $SiH_4$, $H_2$, or hydrocarbon in such an SiC monocrystal growth method as described above. In the presence of such a reactive gas, graphite is sublimated, and the heat resistance of graphite is considerably deteriorated. Therefore, use of a container including a metal carbide, of which the melting point is much higher than that of graphite, instead of the graphite container is also conceivable, but a metal carbide such as tantalum carbide or hafnium carbide is an intractable material as well as an expensive material. Thus, it is conceivable to coat a surface of a base such as graphite with a carbide sintered body. In a coating method, it is conceivable that for example, a surface of a graphite material base is coated with a metal having a high melting point by vapor deposition or the like, and the metal is carbonized; however, there are problems in that cracks are generated in a carbide coating due to volume expansion in the carbonization of the metal in the surface layer, and the carbide coating is prone to be peeled from the base.

For such problem as described above, for example, JP H09-175876 A, proposes a refractory member in which a graphite material base is coated with niobium carbide by disposing a coating film of niobium pentoxide on a surface of a graphite material base, and burning the coating film. JP 2010-248060 A proposes that a carbide coating is disposed on a high-temperature-resistant base such as a graphite base using a paste obtained by adding a sintering aid to a carbide powder such as niobium carbide. WO 2018/164118 A proposes that a carbide sintered body layer that has high density and is also excellent in gas shielding properties can be formed on a surface of a base such as graphite by using a paste obtained by adding a sintering aid including a specific fluoride to a carbide having a melting point of 3000° C. or more, such as tantalum carbide.

Although the corrosion resistance of a graphite material base is improved by disposing a carbide coating on a surface of the graphite material base as described in JP H09-175876 A, JP 2010-248060 A, and WO 2018/164118 A, corrosion resistance influenced by a sublimated gas or a reactive gas used in SiC monocrystal growth has been susceptible to improvement. Even in a case in which a carbide coating is disposed to be metallurgically bonded to a surface of a graphite material base, repetition of a heat cycle of warming and cooling may cause the carbide coating to be peeled from the graphite material base due to a difference between the thermal expansion coefficients of both.

Accordingly, an objective of the present invention is to provide a refractory member that is excellent in corrosion resistance and excellent in the adhesiveness of a carbide coating disposed on a surface of a graphite material base. Another objective of the present invention is to provide a method of producing the refractory member described above.

SUMMARY

The present inventors obtained findings that in a case in which the coating of a carbide layer is disposed on a surface of a graphite material base, a carbide is formed in a state in which an oxide is melted and impregnated up to the deep part of the graphite material base by applying the oxide to a surface of the graphite material base and performing reduction treatment of the oxide rather than by directly disposing a carbide on the surface of the graphite material base, and is then sintered not only to improve the corrosion resistance of a formed carbide coating but also to prominently improve the adhesiveness of the carbide coating with the graphite material base. The present invention is based on such findings. In accordance with the present invention, the following refractory member and method of producing the refractory member are provided.

[1] A refractory member including: a graphite material base; and a carbide layer disposed to coat at least a part of a surface of the graphite material base, wherein
the graphite material base includes a graphite material phase and a pore,
the carbide layer includes a composite region, and
the composite region includes an alternating region in which a continuous graphite material phase of at least 50 μm or more and a continuous carbide phase of at least 50 μm or more alternately exist in a horizontal direction along an interface between the graphite material base and the carbide layer, as viewed in a cross section along a thickness direction of the carbide layer.

[2] The refractory member according to [1], wherein the composite region has a thickness of 50 to 1000 μm.

[3] The refractory member according to [1] or [2], wherein a rate of the carbide phase in the composite region is 10 to 60 area %, as viewed in a cross section along the thickness direction of the carbide layer.

[4] The refractory member according to any one of [1] to [3], wherein a rate of the graphite material phase in the composite region is 40 to 90 area %, as viewed in a cross section along the thickness direction of the carbide layer.

[5] The refractory member according to any one of [1] to [4], wherein the carbide layer further includes a carbide region on the composite region, and a continuous graphite material phase of less than 50 μm and a continuous carbide phase of at least 50 μm or more exist on the carbide region in a horizontal direction along an interface between the graphite material base and the carbide layer, as viewed in a cross section along the thickness direction of the carbide layer.

[6] The refractory member according to [5], wherein the carbide region has a thickness of 10 to 300 μm.

[7] The refractory member according to [5] or [6], wherein a rate of the carbide phase in the carbide region is 50 to 99 area %, as viewed in a cross section along the thickness direction of the carbide layer.

[8] The refractory member according to any one of [5] to [7], wherein a rate of the graphite material phase in the carbide region is 0 to 10 area %, as viewed in a cross section along the thickness direction of the carbide layer.

[9] The refractory member according to any one of [1] to [8], wherein the carbide is selected from a group consisting of niobium carbide and tantalum carbide.

[10] A method of producing the refractory member according to any one of [1] to [9], the method including:

preparing a graphite material base including a graphite material phase and a pore;

applying an oxide-containing liquid to at least a part of a surface of the graphite material base;

performing heating of the graphite material base, to which the oxide-containing liquid has been applied, to melt the oxide;

impregnating the pore of the graphite material base with the molted oxide; and performing carbonization of the oxide with the graphite material base as a carbon source to form a carbide.

Advantageous Effects of Invention

In accordance with the present invention, there can be provided a refractory member that is excellent in corrosion resistance and excellent in the adhesiveness of a carbide coating disposed on a surface of a graphite material base.

DETAILED DESCRIPTION OF THE INVENTION

<Refractory Member>

Figure 1:
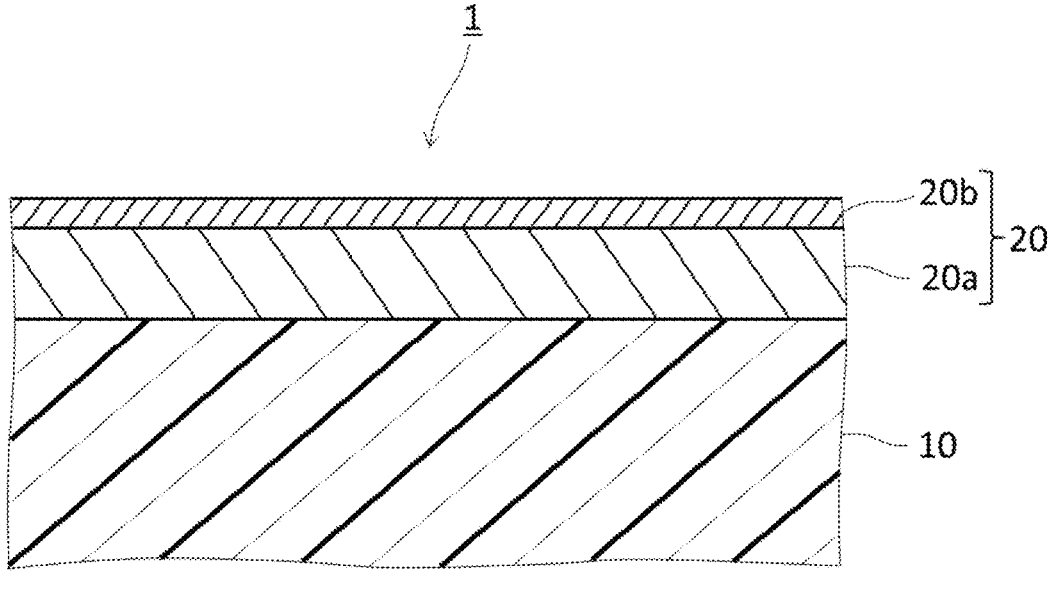
FIG. 1 is a cross-sectional schematic view of a refractory member according to one embodiment of the present invention.

A refractory member 1 according to the present invention includes a graphite material base 10 and a carbide layer 20 disposed to coat at least a part of a surface of the graphite material base 10, as illustrated in FIG. 1. The carbide layer 20 includes a composite region 20a including an alternating region in which a graphite material phase and a carbide phase alternately exist, and may further include a carbide region 20b on the composite region 20a.

Figure 2:
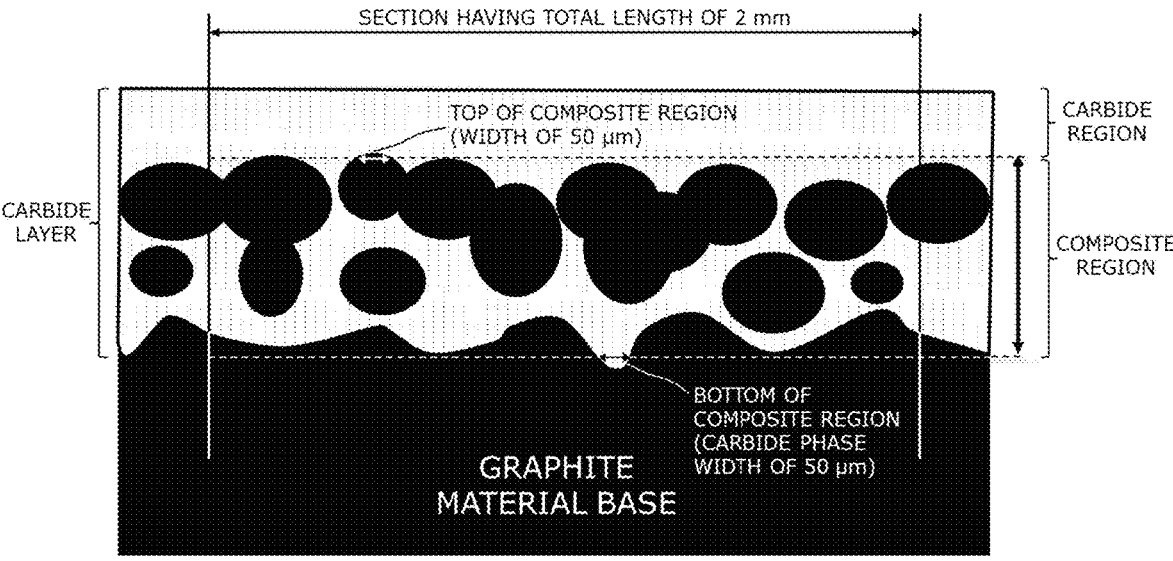
FIG. 2 is a schematic view of a cross-sectional electron microscope photograph of a refractory member including a carbide layer.

In the present invention, the composite region 20a is defined as a region including an alternating region in which a continuous graphite material phase of at least 50 μm or more and a continuous carbide phase of at least 50 μm or more alternately exist in a horizontal direction along an interface between the graphite material base 10 and the carbide layer 20, as viewed in a cross section (cross section in FIG. 1) along the thickness direction of the carbide layer 20. The carbide region 20b is defined as a region in which a continuous graphite material phase of less than 50 μm and a continuous carbide phase of at least 50 μm or more exist in the horizontal direction along the interface between the graphite material base 10 and the carbide layer 20. Specifically, a site, on which the carbide layer is formed, of the refractory member is sampled, and the sample is embedded into a resin, a cross section thereof is mirror-polished, and the polished surface is observed with an electron microscope (50 times). FIG. 2 schematically represents a cross-sectional microscope photograph. As illustrated in FIG. 2, lines having a lateral length of 2 mm (100 mm by 50 times) in parallel along a boundary between the embedding resin and the refractory member are drawn on the obtained electron micrograph, and a region between the top line and the bottom line, including an alternating region in which a graphite material phase derived from a continuous graphite material base of 50 μm or more and a continuous carbide phase of 50 μm or more alternately exist on the lines, is regarded as "composite region". Moreover, a region between the top line and a line drawn on the boundary between the embedding resin and the refractory member is regarded as "carbide region". Each size of the graphite material phase and the carbide phase can be measured, for example, on an electron microscopy photograph (50 times) of a cross section of the refractory member using common image analysis software or the like.

The composite region preferably includes the alternating region described above, and need not consist of a continuous carbide phase of 50 μm or more and a continuous graphite material phase of 50 μm or more. For example, a continuous graphite material phase of less than 50 μm may exist between a continuous carbide phase of 50 μm or more and a continuous carbide phase of 50 μm or more, and a continuous carbide phase of less than 50 μm may exist between a continuous graphite material phase of 50 μm or more and a continuous graphite material phase of 50 μm or more.

In the present invention, in a case in which a carbide layer is coated on a surface of a graphite material base, the carbide layer includes such a composite region as described above, and therefore, corrosion resistance is further improved in comparison with a conventional refractory member coated with a carbide layer including a carbide phase as a main component. The composite region functions as a buffer layer for a thermal expansion gap, and therefore, the carbide layer is inhibited from being peeled from the graphite material base even in the case of repeating a heat cycle of warming and cooling.

In other words, a carbide layer is peeled or cracked little by little due to a gap between the thermal expansion coefficients of a graphite material base and a carbide layer, and reactant gas enters through such a peeled or cracked portion in a case in which a heat cycle of warming and cooling is repeated for a long period in a conventional refractory member in which the carbide layer is coated on a surface of the graphite material base. Moreover, pores exist in the graphite material base, and therefore, reactant gas that has entered through the pores in the graphite material base is diffused up to the deeper part of the graphite material base. The graphite material base that had come into contact with the diffused reactive gas has disappeared by reaction to coarsen the pores, and therefore, the diffusion of the reactive gas has further proceeded to finally wear out the graphite material base, whereby the carbide layer has been peeled over a wide area, and the durability of the refractory member has considerably deteriorated.

In contrast, in the refractory member of the present invention, the thermal expansion gap of the composite region functions as the buffer layer, and therefore, the carbide layer is inhibited from being peeled and cracked even in long-term use in which the heat cycle is repeated. Moreover, the reactant gas can be inhibited from being diffused up to the deep part because the carbide phase exists as the composite region in the pores of the graphite material base even in a case in which small peeling or cracking partly occurs on the surface of the refractory member. In addition, the reactive gas that has entered through a peeled or cracked portion does not react with the carbide phase, and therefore, such diffusion of the reactive gas as described above is also prevented from being promoted. It is considered that the graphite material base is inhibited from being worn out in a short time because fine particles having high reaction activity do not exist even in a case in which the reactive gas reacts with the graphite material phase. Accordingly, the corrosion resistance of the refractory member according to the present invention is superior to that of the conventional refractory member in which the carbide layer is coated on the surface of the graphite material base.

The graphite material phase in the composite region is preferably continuous in a range of 80 to 1950 µm in the horizontal direction along the interface between the graphite material base and the carbide layer, and the carbide phase in the composite region is preferably continuous in a range of 80 to 1950 µm in the horizontal direction along the interface of the graphite material base and the carbide layer. In the composite region, each continuous region of the graphite material phase and the carbide phase has a certain size (that is, the individual regions have respective certain sizes), whereby an effect of relaxing a thermal expansion coefficient can be significantly exhibited to enable the adhesion reliability of the carbide layer to be excellent.

The graphite material phase in the composite region is preferably continuous in a range of 50 µm to 1950 µm, and more preferably continuous in a range of 80 µm to 1000 µm in the direction (that is, cross-sectional thickness direction) orthogonal to the horizontal direction. Moreover, the carbide phase in the composite region is preferably continuous in a range of 50 µm to 1950 µm, and more preferably continuous in a range of 80 µm to 1000 µm in the direction (that is, cross-sectional thickness direction) orthogonal to the horizontal direction. In the cross-sectional thickness direction of the composite region, each continuous region of the graphite material phase and the carbide phase has a certain size, whereby an effect of relaxing a thermal expansion coefficient is also enhanced, and an effect of suppressing the entry of reactive gas is further enhanced.

With regard to the rates of the graphite material phase and the carbide phase in the composite region, the rate of the carbide phase in the composite region is preferably 10 to 60 area %, and more preferably 20 to 55 area %, as viewed in a cross section along the thickness direction of the carbide layer. The rate of the graphite material phase in the composite region is preferably 40 to 90 area %, and more preferably 45 to 80 area %. Each area rate of the graphite material phase and the carbide phase is in the range described above, so that an effect of relaxing a thermal expansion coefficient is further enhanced, and an effect of suppressing entry of reactive gas is further enhanced.

Although the larger thickness of the composite region is preferred from the viewpoint of the effect of relaxing a thermal expansion coefficient and the suppression of entry of reactive gas, an increase in the amount of oxide particles in an oxide-containing liquid is required, and increases in the time and number of times of impregnation of oxides in the pores in the graphite material base are required, for increasing the thickness of the composite region, as described later. Therefore, the composite region preferably has a thickness of 50 to 1000 µm, and more preferably has a thickness of 70 to 700 µm, as viewed in a cross section along the thickness direction of the carbide layer from the viewpoint of a balance between the durability and cost of the refractory member.

In the refractory member of the present invention, the carbide layer may include the carbide region as well as the composite region, as described above, and the inclusion of the carbide region results in further improvement in corrosion resistance and peeling resistance. The graphite material phase in the carbide region is preferably continuous in less than 50 µm, and more preferably continuous in less than 30 µm in the horizontal direction along the interface between the graphite material base and the carbide layer. From the viewpoint of improving corrosion resistance and peeling resistance, the graphite material phase in the carbide region may continue in less than 10 µm in the direction (that is, cross-sectional thickness direction) orthogonal to the horizontal direction, and the graphite material phase may rarely exist.

The carbide phase in the carbide region is preferably continuous in at least 50 µm or more, more preferably continuous in 100 µm or more, and still more preferably continuous in 200 µm or more in the horizontal direction along the interface between the graphite material base and the carbide layer from the viewpoint of improving corrosion resistance and peeling resistance. From the viewpoint of improving corrosion resistance and peeling resistance, the cross-sectional thickness of the carbide phase in the carbide region (the thickness in the direction orthogonal to the horizontal direction) is more preferably continuous 10 µm or more, and still more preferably continuous 30 µm or more.

From both the viewpoints of a cost and improvement in corrosion resistance and peeling resistance, the carbide region preferably has a thickness of 10 to 300 µm, and more preferably has a thickness of 50 to 150 µm, as viewed in a cross section along the thickness direction of the carbide layer.

The graphite material base included in the refractory member includes a material of graphite, and a usual material of graphite used as a fire-resisting material can be used as the material of graphite without particular limitation. Examples thereof include artificial graphites produced by heat-treating natural graphite, petroleum-based coke, and coal-based coke. In the present invention, the graphite material phase may consist of such a material as described above, or may include various inorganic materials as well as the material. For example, natural graphite, silicon carbide, alumina, mullite, heat-resistant ceramics such as clay, silica, and feldspar, antioxidants such as boron oxide, silicon, and the like may be included. The graphite material base can be obtained by adding a binding material to the material described above, molding the mixture into a desired shape by a hydrostatic pressure press method, a lathe molding method, a die molding method, a slip casting process, a vibration molding method, or the like, burying the resultant in non-oxidative atmosphere or coke breeze, and carbonizing the resultant at a temperature of around 1100 to 3000° C.

The graphite material base described above includes the graphite material phase and the pores. The composite region of the carbide layer is formed by permeation of an oxide in the pores of the graphite material base as described later, and therefore, it is desired that the composite region has high porosity from the viewpoint of easiness of formation of the composite region. In contrast, the strength of the graphite material base in itself tends to decrease with increasing the porosity. Because it is virtually difficult that the oxide permeates all the pores, diffusion is also promoted in the case of entry of reactive gas when there are many pores remaining as gaps after immersion. Therefore, the graphite material base preferably has a porosity of 8 to 30%, and more preferably 11 to 20% from the viewpoint of balancing improvement in structural strength, corrosion resistance, and peeling resistance for the refractory member. The porosity is a value (%) expressed as a percent of a value obtained by subtracting the ratio of a bulk density to the theoretical density of the graphite material base from 1. The bulk density means a value measured according to JIS-R1634. The bulk density of the graphite material base is preferably 1.4 to 1.9, and more preferably 1.6 to 1.8 depending on the porosity.

The mean diameter (mean pore diameter) of the pores of the graphite material base is preferably 50 to 300 μm, and more preferably 100 to 250 μm from the viewpoint of balancing the permeation performance of an oxide in the case of forming the composite region of the carbide layer and the strength of the graphite material base in itself.

An oxide permeates the pores of the graphite material base, and the oxide then carbonizes a neighboring graphite material base as a carbon supply source, whereby the composite region is formed, as described later. The carbonization reaction of the oxide begins with a reaction between the oxide and the graphite of fine particles existing around the oxide, and therefore, proceeding of the carbonization of the oxide allows the coarse particles of the graphite to tend to remain around the oxide. As a result, "composite region" in which the carbide phase formed by carbonizing the oxide and the graphite phase including the graphite coarse particles coexist is considered to be facilitated. A difference between the particle diameters of the graphite coarse particles and the fine particles in the graphite material base is increased with increasing the maximum particle diameter of the graphite particles. The greater the difference between the particle diameters is, the more preferentially fine particles with high activity are consumed in the carbonization reaction. Therefore, the larger maximum particle diameter of the graphite material phase is considered to be preferred for allowing the graphite material phase to remain to a certain extent in a process of forming the composite region. In contrast, the strength of the graphite material base in itself tends to be decreased with increasing the maximum particle diameter of the graphite particles. Accordingly, the maximum particle diameter of the graphite material phase included in the graphite material base is preferably 1000 to 3000 μm, and more preferably 1500 to 2500 μm from the viewpoint of balancing improvement in structural strength, corrosion resistance, and peeling resistance for the refractory member.

A graphite material base may be selected according to the thermal expansion coefficient (about $6.0 \times 10^{-6}/°$ C.) of a carbide layer so that a thermal expansion gap between a graphite material base and the carbide layer is decreased in order to improve durability in a conventional refractory member. In the present invention, the composite region functions as relaxing a thermal expansion gap, and therefore, the thermal expansion coefficient of the carbide layer and the thermal expansion coefficient of the graphite material base are not necessarily matched, and the range of choice of the graphite material base is widened. For example, as the graphite material base, an expensive CIP material is not necessarily used, and an inexpensive extruded material can also be used. The preferred range of the thermal expansion coefficient of such a graphite material base is 1.0 to $7.0 \times 10^{-6}/°$ C., and more preferably 4.0 to $6.0 \times 10^{-6}/°$ C.

A carbide known as a metal carbide having a high-melting point can be preferably used as the carbide included in the carbide layer. Examples thereof include titanium carbide (Tm=3530° C.), zirconium carbide (Tm=3803° C.), hafnium carbide (Tm=3887° C.), niobium carbide (Tm=3800° C.), tantalum carbide (Tm=3880° C.), and tungsten carbide (Tm=3058° C.). Of these, niobium carbide and tantalum carbide can be preferably used from the viewpoint of heat resistance and resistance to reactivity with reactant gas, or these may also be used in mixture of two or more kinds thereof.

Examples of the oxide used as a raw material for forming the composite region of the carbide layer include titanium oxide (Tm=1870° C.), zirconium oxide (Tm=2720° C.), hafnium oxide (Tm=2760° C.), niobium oxide (Tm=1490° C.), tantalum oxide (Tm=1870° C.), and tungsten oxide (Tm=2470° C.). As the oxide, an oxide having a lower melting point is preferred because a temperature at which impregnation is started can be reduced and the viscosity of melt can be decreased. From this viewpoint, niobium oxide can be preferably used. For the purpose of decreasing the melting point of the oxide, two or more kinds thereof may be mixed, or a low-melting-point compound that volatilizes in baking may be mixed.

<Method of Producing Refractory Member>

The refractory member of the present invention is characterized in that the carbide layer includes the composite region as described above. A method of producing the refractory member having such a structure is described below.

First, such a graphite material base including a graphite material phase and pores as described above is prepared. The shape of the graphite material base is not particularly limited, and may be the shape of a bottomed opening container such as a crucible, as well as a flat-plate-shape.

Subsequently, an oxide-containing liquid is applied to at least a part of a surface of the graphite material base to form a coating film. The oxide used in such a case is an oxide of the metal described above (titanium, zirconium, hafnium, niobium, tantalum, tungsten, or the like). The metal oxide preferably has a granular form from the viewpoint of homogeneous dispersion in an oxide-containing liquid and from the viewpoint of easily filling the graphite material base into pores. The mean particle diameter of the oxide is not particularly limited, but is preferably in a range of 0.05 to 20.0 μm, and more preferably in a range of 0.1 to 10.0 μm from the viewpoint of a production cost and formation of a homogeneous carbide layer because there is a tendency that with decreasing the mean particle diameter, the cost of a raw material is increased and the complication of a process in preparation of the oxide-containing liquid is increased, and in contrast, difficulty in obtaining a homogeneous coating film is increased with increasing the mean particle diameter, and a difference between the film thicknesses of coating films leads to the local difference of the amount of the oxide in the case of forming melt. The mean particle diameter means a mean particle diameter (Fischer diameter) measured by an air permeability method using a Fischer subsieve sizer. The mean particle diameter of the metal oxide can be appropriately adjusted by a synthesis condition and a pulverization condition. Shorter pulverization time tends to result in the larger particle diameter of a substance to be ground, while longer pulverization time tends to result in the smaller particle diameter and a narrower particle size distribution.

The oxide-containing liquid for application in coating film form may be a dispersion liquid obtained by dispersing the metal oxide in a solvent as described later, may be the colloidal solution or ammonium salt solution of the metal oxide, or may be slurry or paste with a high solid content. The excessively low solid content concentration of the oxide-containing liquid (content of metal oxide) tends to result in the higher number of times of coating for obtaining a coating film having a desired thickness, while the excessively high solid content concentration tends to result in the deterioration of a coating property. Therefore, the solid content concentration is preferably 5 to 95% by mass from the viewpoint of balancing a cost and the formation of a coating film having a uniform film thickness. The amount and thickness of the composite region can be controlled by the thickness of the oxide-containing liquid coating film because the graphite material base is impregnated with the oxide to form the composite region.

Use of a metal oxide colloidal solution or a salt solution of a polymetallic acid ion (for example, metal oxide ammonium solution) as the oxide-containing liquid allows the metal oxide to be filled into even small pores, and therefore causes the corrosion resistance and peeling resistance of the obtained refractory member to be further improved. For example, the graphite material base may be immersed in a metal oxide colloidal solution or a metal oxide ammonium salt solution. In such a case, a filling rate into the pores of the graphite material base can be increased by immersing under reduced pressure.

The metal oxide colloid can be produced by a known method, for example, an ion exchange method, a deflocculation method, a hydrolysis method, or a reaction method. The metal oxide ammonium salt can be obtained by treating such a metal as described above with ammonium nitrate, ammonium chloride, ammonium carbonate, ammonium acetate, or the like.

The oxide-containing liquid may appropriately include a sintering aid that is commonly used in the case of sintering a ceramic material in order to allow sufficient sintering after making the metal oxide into the carbide. A metal that can be sublimated during melting or sintering in a temperature zone (1400 to 2500° C.) in which sintering is started, such as titanium (Ti), chromium (Cr), iron (Fe), cobalt (Co), nickel (Ni), or calcium (Ca), or a carbide thereof, or a fluoride can be preferably used as the sintering aid. Examples of the fluoride include beryllium fluoride, magnesium fluoride, calcium fluoride, barium fluoride, lanthanum fluoride, and cerium fluoride. Among the fluorides, magnesium fluoride, calcium fluoride, barium fluoride, lanthanum fluoride, and cerium fluoride are preferred in view of enabling sufficient linkage of a carbide by melting of the sintering aid before the solidification sintering of a carbide by the sublimation or vaporization of the sintering aid.

The sintering aid described above preferably also has granular form from the viewpoint of homogeneous dispersion in the oxide-containing liquid, and the sintering aid having a mean particle diameter ranging from 0.1 to 10.0 μm is preferably used. The definition of the mean particle diameter is similar to the above.

The amount of the added sintering aid may be 0.01 to 5% by mass with respect to that of the metal oxide.

The oxide-containing liquid may include a binder resin as well as the metal oxide and the sintering aid. The viscosity adjustment, application property, and handleability of the oxide-containing liquid are facilitated by adding the binder resin. The binder resin is not particularly limited as long as such effects as described above is obtained. Examples of the binder resin include polyvinyl alcohol resin, acrylic resin, methacrylic resin, polyvinyl butyral resin, methyl cellulose resin, ethyl cellulose resin, acetyl cellulose resin, phenol resin, urea resin, and melamine resin. These binder resins may be used in mixture of two or more kinds thereof. A preferred binder resin is polyvinyl butyral resin.

The content of the binder resin blended in the oxide-containing liquid influences the viscosity of the oxide-containing liquid, and the higher viscosity results in the deteriorated uniformity of the film thickness of the coating film. A range of approximately 0.1 to 2.0 parts by mass with respect to 100 parts by mass of the metal oxide is preferred.

The oxide-containing liquid may include an additive for improving the dispersibility of the metal oxide and the sintering aid, as well as the binder resin. For example, polyethyleneimine-based polymer dispersants, polyurethane-based polymer dispersants, polyallylamine-based polymer dispersants, and the like can be preferably used. The content of the additive is preferably in a range of 0.03 to 1 part by mass with respect to 100 parts by mass of the metal oxide.

The oxide-containing liquid may include a solvent as well as the binder resin and the additive. Examples of the solvent include organic solvents such as ethanol, benzyl alcohol, toluene, dimethylacetamide, and methyl ethyl ketone, and these may be used in a mixture of one or two or more kinds thereof. The viscosity of the oxide-containing liquid can also be appropriately adjusted by the content of the solvent, and a range of approximately 5.0 to 30.0 parts by mass with respect to 100 parts by mass of the metal oxide is preferred.

Subsequently, the graphite material base to which the oxide-containing liquid is applied is heated to melt the oxide, and the pores of the graphite material base are impregnated with the melted oxide. In a conventional method of applying carbide paste, a carbide is not melted even by heating, and the carbide is sintered to simply metallurgically bind with a graphite material base. In contrast, the metal oxide can be impregnated up to the deep part of the graphite material base having pores because the metal oxide described above can be melted by using the oxide-containing liquid as in the case of the production method of the present invention.

The heating is not particularly limited as long as the heating is performed at a temperature at which the metal oxide can be melted, and the temperature is preferably 1450 to 2000° C. Heating time is 30 minutes to around several hours, and preferably around 1 hour.

Then, the metal oxide is carbonized in a state in which metal oxide is filled into the pores of the graphite material base. In the carbonization of the metal oxide, the graphite material base is used as a carbon source. In other words, carbon is supplied from the graphite material phase around the pores to carbonize the metal oxide filled into the pores. Therefore, the carbonization of the metal oxide causes the size of the metal oxide to be larger than the size of the former pores prior to the filling. In such a manner, the composite region in which the graphite material phase and the carbide phase coexist is formed. In the carbon source, consumed in such a case, in the graphite material base, the graphite of fine particles having high activity is preferentially consumed. Therefore, the activity of the graphite material base is decreased in the sintering element treated in the present invention (that is, the coarse particles of graphite predominate), and therefore, the corrosion resistance of the sintering element is improved in comparison with that of an initial graphite material base.

The carbonization temperature of the metal oxide is preferably 2000 to 2500° C. The time of the carbonization treatment is around several hours, preferably around 1 to 4 hours. The generated carbide is sintered to form the carbide phase by heating in the carbonization treatment. The carbonization treatment is preferably performed for preventing oxidization under inert atmosphere. The heating for impregnation of the oxide described above and the heating for carbonization into the carbide may also be performed in an identical temperature-rising profile.

The steps from the coating of the oxide-containing liquid to the subsequent carbonization treatment may be repeatedly performed. Only the one coating of the oxide-containing liquid causes the composite region to be formed as the carbide layer, but may result in insufficient formation of such a carbide region as described above. The carbide region having a desired thickness can be formed by repeatedly performing the steps from the coating of the oxide-containing liquid and to the subsequent carbonization treatment.

The carbide region having a desired thickness can also be formed by forming the composite region by the steps from the coating of the oxide-containing liquid to the subsequent carbonization treatment and then applying and burning conventional carbide paste. It is also acceptable to apply carbide paste onto the coating film of the oxide-containing liquid and to perform heating for impregnation of an oxide, heating for carbonization into a carbide, and the formation of the carbide region and the sintering of the carbide in an identical temperature-rising profile.

EXAMPLES

An embodiment of the present invention is specifically described with reference to the following Examples, but the present invention is not limited to these Examples.

Example 1

<Preparation of Graphite Material Base>

A graphite base having a bulk density of 1.64 g/cm$^3$ and a thermal expansion coefficient of $4.4 \times 10^{-6}$/° C. (extruded material, manufactured by SEC CARBON, LIMITED) was used as a graphite material base. Cross-sectional electron microscope observation of the graphite base revealed that a mean pore diameter was 250 μm, and the maximum particle diameter of a graphite material phase was 2.3 mm. A porosity was 18%.

<Preparation of Oxide-Containing Liquid>

Niobium oxide particles having a mean particle diameter of 1.5 μm (purity of 99.9%, manufactured by MITSUI MINING & SMELTING CO., LTD.) were prepared. CaF$_2$ having a mean particle diameter of 10 μm (purity of 99.9%, manufactured by Hakushin Chemical Laboratory Co., Ltd.) was pulverized to have a mean particle diameter of 1.5 μm, and the resultant was used as a sintering aid.

To 100 parts by mass of the niobium oxide particles described above, 1 part by mass of the sintering aid (CaF$_2$) was added, 0.5 parts by mass of polyvinyl butyral resin (manufactured by Sekisui Chemical Co., Ltd.) as a resin binder, 0.5 parts by mass of polyethyleneimine having a mean weight molecular weight of 10000 (manufactured by Wako Pure Chemical Industries, Ltd.) as an additive, and 20 parts by mass of ethanol as a solvent were further blended at the rates described above, and the resultant was mixed using a hybrid mixer (ARE-310, manufactured by THINKY CORPORATION) for 120 seconds, whereby an oxide-containing liquid was prepared.

<Preparation of Carbide Paste>

Niobium carbide particles having a mean particle diameter of 1.5 μm (purity of 99.9%, manufactured by MITSUI MINING & SMELTING CO., LTD.) were prepared. CaF$_2$ having a mean particle diameter of 10 μm (purity of 99.9%, manufactured by Hakushin Chemical Laboratory Co., Ltd.) was pulverized to have a mean particle diameter of 1.5 μm, and the resultant was used as a sintering aid.

To 100 parts by mass of the niobium carbide particles described above, 1 part by mass of the sintering aid (CaF$_2$) was added, 0.5 parts by mass of polyvinyl butyral resin (manufactured by Sekisui Chemical Co., Ltd.) as a resin binder, 0.5 parts by mass of polyethyleneimine having a mean weight molecular weight of 10000 (manufactured by Wako Pure Chemical Industries, Ltd.) as an additive, and 20 parts by mass of ethanol as a solvent were further blended at the rates described above, and the resultant was mixed using a hybrid mixer (ARE-310, manufactured by THINKY CORPORATION) for 120 seconds, whereby carbide paste was prepared.

<Production of Refractory Member>

First, a surface of the prepared graphite base was brush-coated with the oxide-containing liquid obtained as described above to form a coating film. With regard to the amount of the coating, thicknesses before and after the coating were measured by a micrometer, and the thickness of the coating after drying was adjusted to be about 280 μm. Then, the graphite base on which the coating film was formed was dried at a temperature of 50° C. to remove the solvent from the coating film. Then, the temperature of the graphite base on which the coating film was dried was increased at 200° C./h under argon atmosphere, maintained at 1600° C. for 1 hour, and then decreased to room temperature at 200° C./h.

Subsequently, the surface of the graphite base which had been heat-treated as described above and on which the film had been formed was brush-coated with the carbide paste to form a coating film. With regard to the amount of the coating, thicknesses before and after the coating were measured by a micrometer, and the thickness of the coating after drying was adjusted to be about 150 μm. Then, the graphite base on which the coating film was formed was dried at a temperature of 50° C. to remove the solvent from the coating film. Then, the temperature of the graphite base on which the coating film was dried was increased at 200° C./h under argon atmosphere, maintained at 2400° C. for 4 hours, and then decreased to room temperature at 200° C./h, thereby producing a refractory member.

Figure 3:
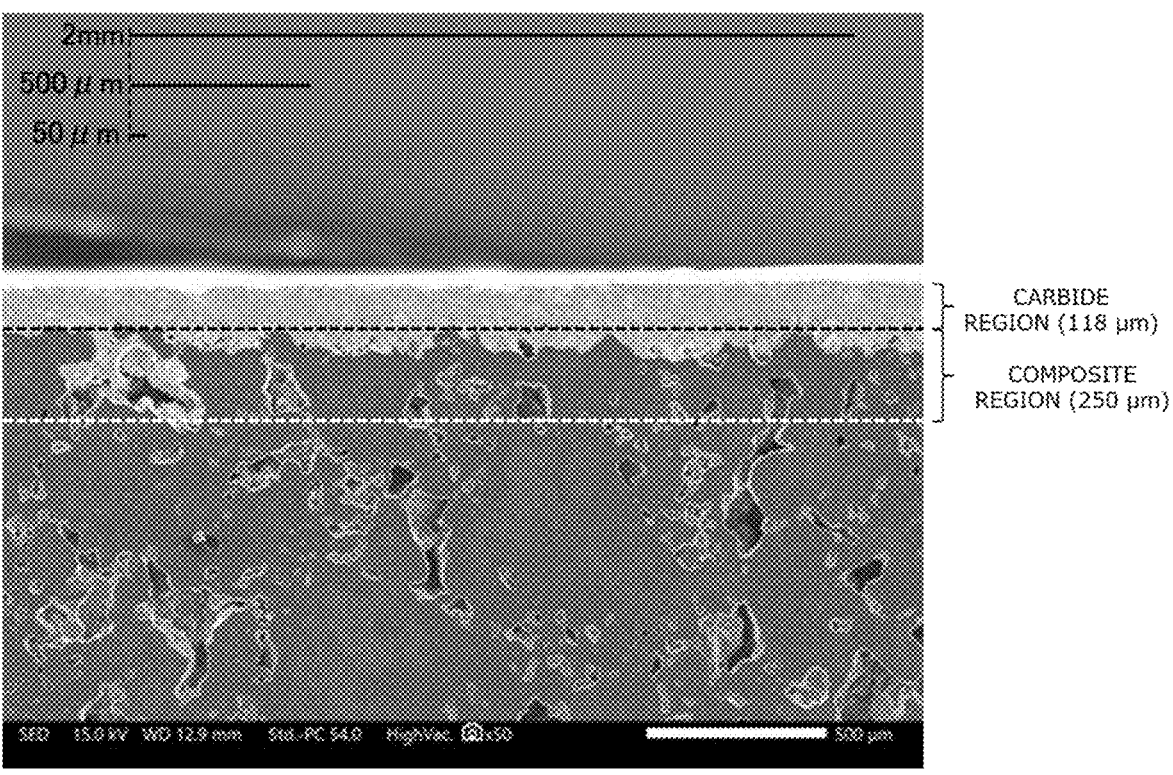
FIG. 3 is a cross-sectional electron microscope photograph (50 times) of a refractory member in Example 1.

The refractory member obtained as described above was sampled to include the surface, the sample was embedded into a resin, a cross section was then mirror-polished, and a polished surface was observed with an electron microscope (50 times). A cross-sectional electron microscope photograph is illustrated in FIG. 3.

Example 2

A refractory member was produced in a manner similar to that in Example 1 except that Co having a mean particle diameter of 3.7 μm (purity of 99.95%, manufactured by Freeport Cobalt) was used as a sintering aid instead of the sintering aid ($CaF_2$) used in the preparation of the oxide-containing liquid and the carbide paste, and the coating amount of an oxide-containing liquid was adjusted so that the thickness of the coating after drying was about 100 μm.

Example 3

A refractory member was produced in a manner similar to that in Example 1 except that a graphite base (extruded material, manufactured by SEC CARBON, LIMITED) having a bulk density of 1.8 g/cm³, a thermal expansion coefficient of $4.4 \times 10^{-6}$/° C., a mean pore diameter of 100 μm, and a maximum particle diameter of 2.3 mm was used as a graphite material base, and the coating amount of an oxide-containing liquid was adjusted so that the thickness of the coating after drying was about 300 μm.

Example 4

A refractory member was produced in a manner similar to that in Example 1 except that a graphite base having a bulk density of 1.74 g/cm³, a thermal expansion coefficient of $4.4 \times 10^{-6}$/° C., a mean pore diameter of 200 μm, and a maximum particle diameter of 1.5 mm (extruded material, manufactured by SEC CARBON, LIMITED) was used as a graphite material base, and Co having a mean particle diameter of 3.7 μm (purity of 99.95%, manufactured by Freeport Cobalt) was used as a sintering aid instead of the sintering aid ($CaF_2$) used in the preparation of the oxide-containing liquid and the carbide paste. The thickness of the coating after drying of the oxide-containing liquid was adjusted to be about 320 μm.

Example 5

A refractory member was produced in a manner similar to that in Example 2 except that an oxide-containing liquid was prepared so that the thickness of coating after drying was about 400 μm with regard to the coating amount of the oxide-containing liquid, burning was performed under the following conditions, and the carbide paste was not applied. The temperature of the graphite base on which the oxide coating film was dried was increased at 200° C./h under argon atmosphere, maintained at 1600° C. for 1 hour, further increased at 200° C./h, maintained at 2400° C. for 4 hours, and then decreased to room temperature at 200° C./h, whereby the burning was performed.

Example 6

A beaker in which the graphite base (having a bulk density of 1.64 g/cm³, a thermal expansion coefficient of $4.4 \times 10^{-6}$/°

C., a mean pore diameter of 250 μm, and a maximum particle diameter of 2.3 mm) used in Example 1 and an ammonium niobate solution (having a solid content of 10% by mass) were put was put in a vacuum chamber, which was depressurized to reach 10 (Pa), the graphite base was immersed in the ammonium niobate solution under reduced pressure, and the graphite base was then taken out of the beaker, and dried under ordinary pressure. This operation was repeated ten times to crystallize the ammonium niobate that had penetrated the graphite base to generate niobium oxide (niobium sol). Then, the temperature of the graphite base was increased at 200° C./h under argon atmosphere, maintained at 1600° C. for 1 hour, and then decreased to room temperature at 200° C./h.

Subsequently, the surface of the graphite base which had been heat-treated as described above and on which the film had been formed was brush-coated with the carbide paste used in Example 2 to form a coating film. With regard to the amount of the coating, thicknesses before and after the coating were measured by a micrometer, and the thickness of the coating after drying was adjusted to be about 100 μm. Then, the graphite base on which the coating film was formed was dried at a temperature of 50° C. to remove the solvent from the coating film. Then, the temperature of the graphite base on which the coating film was dried was increased at 200° C./h under argon atmosphere, maintained at 2400° C. for 4 hours, and then decreased to room temperature at 200° C./h, thereby producing a refractory member.

Example 7

<Preparation of Graphite Material Base>

The same graphite base as the graphite base used in Example 1 was used.

<Preparation of Oxide-Containing Liquid>

Tantalum oxide particles having a mean particle diameter of 1.5 μm (purity of 99.9%, manufactured by MITSUI MINING & SMELTING CO., LTD.) were prepared. Co having a mean particle diameter of 3.7 μm (purity of 99.95%, manufactured by Freeport Cobalt) was used as a sintering aid.

To 100 parts by mass of the tantalum oxide particles described above, 0.5 parts by mass of the sintering aid (Co) was added, 0.5 parts by mass of polyvinyl butyral resin (manufactured by Sekisui Chemical Co., Ltd.) as a resin binder, 0.5 parts by mass of polyethyleneimine having a mean weight molecular weight of 10000 (manufactured by Wako Pure Chemical Industries, Ltd.) as an additive, and 20 parts by mass of ethanol as a solvent were further blended at the rates described above, and the resultant was mixed using a hybrid mixer (ARE-310, manufactured by THINKY CORPORATION) for 120 seconds, whereby an oxide-containing liquid was prepared.

<Preparation of Carbide Paste>

Tantalum carbide particles having a mean particle diameter of 1.5 μm (purity of 99.9%, manufactured by MITSUI MINING & SMELTING CO., LTD.) were prepared. Co having a mean particle diameter of 3.7 μm (purity of 99.95%, manufactured by Freeport Cobalt) was used as a sintering aid.

To 100 parts by mass of the tantalum carbide particles described above, 0.5 parts by mass of the sintering aid (Co) was added, 0.5 parts by mass of polyvinyl butyral resin (manufactured by Sekisui Chemical Co., Ltd.) as a resin binder, 0.5 parts by mass of polyethyleneimine having a mean weight molecular weight of 10000 (manufactured by Wako Pure Chemical Industries, Ltd.) as an additive, and 20 parts by mass of ethanol as a solvent were further blended at the rates described above, and the resultant was mixed using a hybrid mixer (ARE-310, manufactured by THINKY CORPORATION) for 120 seconds, whereby carbide paste was prepared.

<Production of Refractory Member>

First, a surface of the prepared graphite base was brush-coated with the oxide-containing liquid obtained as described above to form a coating film. With regard to the amount of the coating, thicknesses before and after the coating were measured by a micrometer, and the thickness of the coating after drying was adjusted to be about 400 μm. Then, the graphite base on which the coating film was formed was dried at a temperature of 50° C. to remove the solvent from the coating film. Then, the temperature of the graphite base on which the coating film was dried was increased at 200° C./h under argon atmosphere, maintained at 1900° C. for 1 hour, and then decreased to room temperature at 200° C./h.

Subsequently, the surface of the graphite base which had been heat-treated as described above and on which the film had been formed was brush-coated with the carbide paste to form a coating film. With regard to the amount of the coating, thicknesses before and after the coating were measured by a micrometer, and the thickness of the coating after drying was adjusted to be about 100 μm. Then, the graphite base on which the coating film was formed was dried at a temperature of 50° C. to remove the solvent from the coating film. Then, the temperature of the graphite base on which the coating film was dried was increased at 200° C./h under argon atmosphere, maintained at 2400° C. for 4 hours, and then decreased to room temperature at 200° C./h, thereby producing a refractory member.

Comparative Example 1

<Preparation of Graphite Material Base>

The same graphite base as the graphite base used in Example 1 was used.

<Preparation of Carbide Paste>

Tantalum carbide particles having a mean particle diameter of 1.5 μm (purity of 99.9%, manufactured by MITSUI MINING & SMELTING CO., LTD.) were prepared. $CaF_2$ having a mean particle diameter of 10 μm (purity of 99.9%, manufactured by Hakushin Chemical Laboratory Co., Ltd.) was pulverized to have a mean particle diameter of 1.5 μm, and the resultant was used as a sintering aid.

To 100 parts by mass of the tantalum carbide particles described above, 1 part by mass of the sintering aid ($CaF_2$) was added, 0.5 parts by mass of polyvinyl butyral resin (manufactured by Sekisui Chemical Co., Ltd.) as a resin binder, 0.5 parts by mass of polyethyleneimine having a mean weight molecular weight of 10000 (manufactured by Wako Pure Chemical Industries, Ltd.) as an additive, and 20 parts by mass of ethanol as a solvent were further blended at the rates described above, and the resultant was mixed using a hybrid mixer (ARE-310, manufactured by THINKY CORPORATION) for 120 seconds, whereby carbide paste was prepared.

<Production of Refractory Member>

First, a surface of the prepared graphite base was brush-coated with the carbide paste obtained as described above to form a coating film. With regard to the amount of the coating, thicknesses before and after the coating were measured by a micrometer, and the thickness of the coating after drying was adjusted to be about 100 μm. Then, the graphite base on which the coating film was formed was dried at a temperature of 50° C. to remove the solvent from the coating film. Then, the temperature of the graphite base on which the coating film was dried was increased at 200° C./h under argon atmosphere, maintained at 2400° C. for 4 hours, and then decreased to room temperature at 200° C./h, thereby producing a refractory member.

[Evaluation of Refractory Member]

<Confirmation of Carbide Layer>

A site, on which the carbide layer was formed, of each of the refractory members obtained as described above was sampled, and the sample was embedded into a resin, a cross section thereof was mirror-polished, and the polished surface was observed with an electron microscope (50 times).

Lines having a lateral length of 2 mm (100 mm by 50 times) in parallel along a boundary between the embedding resin and the refractory member were drawn on the obtained electron micrograph, and a region between the top line and the bottom line, including an alternating region in which a graphite material phase derived from a continuous graphite material base of 50 μm or more and a continuous carbide phase of 50 μm or more alternately exist on the lines, was regarded as "composite region". Moreover, a region between the top line and a line drawn on the boundary between the embedding resin and the refractory member was regarded as "carbide region". It was confirmed that the continuous graphite material phase derived from the graphite material base of less than 50 μm (including 0 μm) and the continuous carbide phase of 50 μm or more existed in the range of a lateral length of 2 mm (100 mm by 50 times) in an area above the top line (that is, an area closer to the boundary between the embedding resin and the refractory member).

Each of the thicknesses of the composite region and the carbide region was determined based on the electron micrograph. Moreover, the area rates of the graphite material phase and the carbide phase existing in each of the composite region and the carbide region were determined based on the electron micrograph. In a method of calculating the area rates, a portion corresponding to the graphite material phase and a portion corresponding to the carbide phase were marked by visual observation on the basis of the electron micrograph, and the area rates were determined by image analysis. The results of element mapping by EDS analysis in which measurement was performed in an identical visual field were taken into account for the marking. The calculation results were as set forth in the following Table 1.

<Measurement of Amounts of Oxide and Carbide>

A sample with a size of 10 mm×10 mm×2 mm, including the surface, was cut from each refractory member, and pulverized in a mortar to form a powder. The amount of oxygen included in the sample was measured by an oxygen concentration analyzer (EMGA-920, manufactured by HORIBA) using the obtained powder.

<Measurement of Peel Strength after Heat Cycle>

The temperature of each refractory member was increased from room temperature to 2400° C. in argon atmosphere, and maintained for 1 hour, and the furnace cooling was then performed. This cycle was repeated ten times, a pressure sensitive adhesive tape having a width of 30 mm and a length of 100 mm (Olive tape No 141, manufactured by TERAOKA SEISAKUSHO CO., LTD.) was then affixed to the surface of each refractory member, and vigorously peeled in one direction, and the number and sizes of peeled coat layers included in an area of 100 mm×30 mm were evaluated. Evaluation criteria were as follows.

A (best): The number was three or less, and there was no peeled coat layer having a diameter of 3 mm or more.

The evaluation results were as set forth in the following Table 1.

TABLE 1

| | | | Example 1 | Example 2 | Example 3 | Example 4 | Example 5 | Example 6 | Example 7 | Comparative Example 1 |
|---|---|---|---|---|---|---|---|---|---|---|
| Production conditions | Physical properties of graphite material base | Mean pore diameter (μm) | 250 | 250 | 100 | 200 | 250 | 250 | 250 | 250 |
| | | Maximum particle diameter (μm) | 2300 | 2300 | 2300 | 1500 | 2300 | 2300 | 2300 | 2300 |
| | | Porosity (%) | 18 | 18 | 8.5 | 11.3 | 18 | 18 | 18 | 18 |
| | | Bulk density (g/cm³) | 1.64 | 1.64 | 1.8 | 1.74 | 1.64 | 1.64 | 1.64 | 1.64 |
| | | Thermal expansion coefficient ($10^{-6}$/° C.) | 4.4 | 4.4 | 4.4 | 4.4 | 4.4 | 4.4 | 4.4 | 4.4 |
| | Step of coating oxide-containing liquid | Kind of oxide | Niobium oxide | Niobium oxide | Niobium oxide | Niobium oxide | Niobium oxide | Aqueous niobic acid solution | Tantalum oxide | — |
| | | Kind of aid | CaF₂ | Co | Co | Co | Co | — | Co | — |
| | | Amount of aid (% by mass) | 1 | 1 | 1 | 1 | 1 | — | 0.5 | — |
| | | Film thickness after drying (μm) | 280 | 100 | 300 | 320 | 400 | — | 400 | — |
| | Step of coating carbide paste | Kind of carbide | Niobium carbide | Niobium carbide | Niobium carbide | Niobium carbide | — | Niobium carbide | Tantalum carbide | Tantalum carbide |
| | | Kind of aid | CaF2 | Co | Co | Co | — | Co | Co | CaF₂ |
| | | Amount of aid (wt. %) | 1 | 1 | 1 | 1 | — | 1 | 0.5 | 1 |
| | | Film thickness after drying (μm) | 150 | 100 | 100 | 150 | — | 100 | 100 | 100 |
| Physical properties of refractory member | | Thickness of carbide layer (total) (μm) | 368 | 303 | 228 | 368 | 429 | 123 | 176 | 92 |
| | Carbide region | Thickness (μm) | 118 | 95 | 123 | 104 | 31 | 72 | 78 | 92 |
| | | Area occupancy rate of graphite material phase (%) | 5 | 2 | 1 | 6 | 8 | 1 | 1 | 0 |
| | | Area occupancy rate of carbide phase (%) | 71 | 68 | 65 | 66 | 52 | 63 | 62 | 60 |
| | Composite region | Thickness (μm) | 250 | 208 | 105 | 264 | 398 | 51 | 98 | 0 |
| | | Area occupancy rate of graphite material phase (%) | 75 | 70 | 83 | 75 | 50 | 73 | 75 | — |
| | | Area occupancy rate of carbide phase (%) | 12 | 20 | 12 | 20 | 40 | 13 | 11 | — |
| | Content of oxide | ppm by mass | 105 | 13 | 25 | 110 | 82 | 5 | 76 | Minimum limit of detection |
| Evaluation of refractory member | Peel strength (after heat cycle) | | A | A | C | A | A | C | B | D |
| | Wear amount after corrosion test | | A | B | C | B | C | C | B | D |

B (good): The number was four to ten, and there was no peeled coat layer having a diameter of 3 mm or more.

C (fair): The number was 11 to 30, and there was no peeled coat layer having a diameter of 3 mm or more.

D (failing): The number was 31 or more, and there was a peeled coat layer having a diameter of 3 mm or more.

The evaluation results were as set forth in the following Table 1.

<Corrosion Resistance Test>

A sample with a size of 10 mm×10 mm×10 mm, including the surface, was cut from each refractory member, and subjected to exposure at 2500° C. for 100 hours under SiC sublimated gas atmosphere. The mass change rate of the sample before and after a corrosion resistance test was measured, and evaluated together with appearance. Evaluation criteria were as follows.

A (best): The mass change was less than 1%, and there was no coat peeling.

B (good): The mass change was 1 to 3%, and no coat peeling occurred.

C (fair): The mass change was 3 to 5%, and no coat peeling occurred.

D (failing): The mass change was 5% or more, and coat peeling occurred.

The invention claimed is:

1. A refractory member comprising:

a graphite material base; and a carbide layer disposed to coat at least a part of a surface of the graphite material base, wherein the graphite material base comprises a graphite material phase and a pore, the carbide layer comprises a composite region, the composite region comprises an alternating region in which a continuous graphite material phase of at least 50 μm or more and a continuous carbide phase of at least 50 μm or more alternately exist in a horizontal direction along an interface between the graphite material base and the carbide layer, as viewed in a cross section along a thickness direction of the carbide layer, a rate of the graphite material phase in the composite region is 40 to 90 area %, as viewed in a cross section along the thickness direction of the carbide layer, and the carbide is selected from a group consisting of niobium carbide and tantalum carbide.

2. The refractory member according to claim 1, wherein the composite region has a thickness of 50 to 1000 μm.

3. The refractory member according to claim 1, wherein a rate of the carbide phase in the composite region is 10 to 60 area %, as viewed in a cross section along the thickness direction of the carbide layer.

4. The refractory member according to claim 2, wherein a rate of the carbide phase in the composite region is 10 to 60 area %, as viewed in a cross section along the thickness direction of the carbide layer.

5. The refractory member according to claim 1, wherein the carbide layer further comprises a carbide region on the composite region, and a continuous graphite material phase of less than 50 μm and a continuous carbide phase of at least 50 μm or more exist on the carbide region in a horizontal direction along an interface between the graphite material base and the carbide layer, as viewed in a cross section along the thickness direction of the carbide layer.

6. The refractory member according to claim 2, wherein the carbide layer further comprises a carbide region on the composite region, and a continuous graphite material phase of less than 50 μm and a continuous carbide phase of at least 50 μm or more exist on the carbide region in a horizontal direction along an interface between the graphite material base and the carbide layer, as viewed in a cross section along the thickness direction of the carbide layer.

7. The refractory member according to claim 5, wherein the carbide region has a thickness of 10 to 300 μm.

8. The refractory member according to claim 6, wherein the carbide region has a thickness of 10 to 300 μm.

9. The refractory member according to claim 5, wherein a rate of the carbide phase in the carbide region is 50 to 99 area %, as viewed in a cross section along the thickness direction of the carbide layer.

10. The refractory member according to claim 6, wherein a rate of the carbide phase in the carbide region is 50 to 99 area %, as viewed in a cross section along the thickness direction of the carbide layer.

11. The refractory member according to claim 5, wherein a rate of the graphite material phase in the carbide region is 0 to 10 area %, as viewed in a cross section along the thickness direction of the carbide layer.

12. The refractory member according to claim 6, wherein a rate of the graphite material phase in the carbide region is 0 to 10 area %, as viewed in a cross section along the thickness direction of the carbide layer.

* * * * *